(12) United States Patent
Konradsson et al.

(10) Patent No.: US 7,672,328 B2
(45) Date of Patent: Mar. 2, 2010

(54) WLAN TRANSMIT SCHEDULER COMPRISING AN ACCELERATED BACK-OFF FUNCTION

(75) Inventors: Per Konradsson, Järfälla (SE); Örjan Fritz, Hägersten (SE)

(73) Assignee: Nanoradio AB, Kista (SE)

( * ) Notice: Subject to any disclaimer, the term of this patent is extended or adjusted under 35 U.S.C. 154(b) by 286 days.

(21) Appl. No.: 11/908,323

(22) PCT Filed: Mar. 14, 2006

(86) PCT No.: PCT/SE2006/000332

§ 371 (c)(1),
(2), (4) Date: Sep. 11, 2007

(87) PCT Pub. No.: WO2006/098688

PCT Pub. Date: Sep. 21, 2006

(65) Prior Publication Data

US 2008/0212476 A1  Sep. 4, 2008

Related U.S. Application Data

(60) Provisional application No. 60/661,360, filed on Mar. 14, 2005.

(30) Foreign Application Priority Data

Mar. 14, 2005   (SE)   .................................... 0500588

(51) Int. Cl.
*H04L 12/413*  (2006.01)
*H04L 12/43*   (2006.01)

(52) U.S. Cl. ...................................... 370/445; 370/459
(58) Field of Classification Search ................. 370/445, 370/459, 461, 462, 463
See application file for complete search history.

(56) References Cited

U.S. PATENT DOCUMENTS

| | | | | |
|---|---|---|---|---|
| 5,339,316 | A * | 8/1994 | Diepstraten | ................. 370/401 |
| 5,699,515 | A * | 12/1997 | Berkema et al. | ............ 370/448 |
| 5,717,889 | A * | 2/1998 | Rettig | ........................ 370/447 |
| 7,058,071 | B1 * | 6/2006 | Myles et al. | ................ 370/419 |
| 2005/0036571 | A1 | 2/2005 | Shvodian et al. | |

FOREIGN PATENT DOCUMENTS

| | | |
|---|---|---|
| EP | 1333620 | 8/2003 |
| WO | 01/86434 | 11/2001 |

* cited by examiner

*Primary Examiner*—Nittaya Juntima
(74) *Attorney, Agent, or Firm*—Coats & Bennett

(57) ABSTRACT

This invention can generally be described as an overall transmit (TX) scheduler state-machine that is broken down into two different state-machines: One first TX-scheduler state-machine (FTSM), executed in software, and one second TX-scheduler state-machine (STSM) executed in hardware, which is operating in four different basic states. The functional partitioning between the two state-machines is such that the most constrained real-time requirements are allocated to the STSM, while all complex decisions and non time-critical controls are allocated to the FTSM. The invention also relates to a terminal comprising the invented transmit scheduler.

16 Claims, 4 Drawing Sheets

WLAN TRANSMIT SCHEDULER COMPRISING AN ACCELERATED BACK-OFF FUNCTION

TECHNICAL FIELD

The present invention relates to Carrier Sense Multiple Access/Collision Avoidance (CSMA/CA) system. More specific, the present invention relates to a transmit scheduler for a terminal and a terminal in such a system.

BACKGROUND OF THE INVENTION

In any Carrier Sense Multiple Access/Collision Avoidance (CSMA/CA) Network, such as Wireless LAN, one needs to be able to control when to transmit or not. This is accomplished by observing the media used, and trying to transmit when nobody else is using the media.

One important function in this type of Access method is the Back-off function. In a CA (Collision Avoidance) system, it is the job of a transceiver/transmitter (TX) scheduler to observe a shared media and, based on the observations, find a transmit opportunity for the own station.

In 802.11 networks, i.e. networks supporting and working according to the IEEE standard 802.11, the transceiver/transmitter TX dispatcher (i.e. TX scheduler) has to consider the following:

Energy detect on the media originating from non-802.11 stations (microwave-ovens, or Bluetooth devices for example).

Transmissions from other 802.11 stations.

The TX-dispatcher constitutes a conceptual state-machine that takes the above entities as input. By compiling the physical events on the channel with a timestamp related to the respective event, and by examining the content of radio messages sent by other stations, the TX-dispatcher decides when to dispatch a pending transmission to the shared media.

The IEEE 802.11 standard defines a set of rules that strictly and unambiguously controls when a station may access the media for transmission. The problem with this set of rules is that the decision logic becomes complex enough to require CPU processing, while the timing requirements are hard enough to be more suited for hardware processing.

The complexity of the decision logic has been the killing argument for manufacturers of 802.11 chips to choose to implement the TX-dispatcher state-machine in software only.

However, in practice the time course of a media (channel) is fragmented in many ways, which causes severe problems to design a software fulfilling said standard for transmission.

The downside of implementing the state-machine in software is because:

Power consumption is increased, as the CPU has to deal with very high-frequency events.

The performance requirement on the CPU is increased (Higher clock frequency (=higher power consumption) or more advanced CPU (=more expensive solution) is required).

As can be seen above, this is a simple task from a software point of view, but the interrupts can be triggered quite frequently, and there is a lot of time uncertainty.

To address the above stated problem, it has been suggested in the prior art to divide an overall TX-scheduler state-machine into two different state-machines: One first TX-scheduler state-machine (FTSM), executed in software, which controls and administers one second TX-scheduler state-machine (STSM) executed in hardware.

In patent application WO 01/86434 A2 a state machine is shown, implementing a communication protocol such as the Bluetooth protocol. Furthermore, a synchronous Time-Division Duplex (TDD) scheme is described, wherein decisions and state transitions are made periodically in specific points of time. The document only describe a synchronous system and is not adaptable to an asynchronous system wherein avoidance of collisions in a shared media is essential.

The patent application EP 1 333 620 A2 discloses a method for implementing a plurality of backoff counters in a single hardware backoff counter. When state transitions are made, either the software or the hardware adjusts and compares the backoff counters values.

However, the complexity of said known methods and systems are considerable as they require complex hardware and software solutions, wasting a lot of CPU time and battery power.

BRIEF DESCRIPTION OF THE INVENTION

This invention can also generally be described as an overall TX-scheduler state-machine that is broken down into two different state-machines: One first TX-scheduler state-machine (FTSM), executed in software, and one second TX-scheduler state-machine (STSM) executed in hardware. The functional partitioning between the two state-machines is such that the most constrained real-time requirements are allocated to the STSM unit, while all complex decisions and non time-critical controls are allocated to the FTSM. The STSM unit comprises a STSM Controller which is capable of operating in and switching between a number of states comprising four basic states of which one state, the first state (state 1), is present when a backoff period $B_{tot}$ has lapsed, a second state (state 2), when the communication medium is indicated as Busy (BC), a third state (state 3) during a guard period and a fourth state (state 4) during the backoff period measuring or counting.

One object of the present invention is to provide a combined software and hardware solution that is not as complex as earlier known solutions and further, wherein said hardware solution enables the use of a smaller CPU, and also to reduce the necessary CPU processing time, thus decreasing the power consumption considerably.

One of the advantages with the following software managed hardware enables the present invention to use a smaller CPU and reduce the necessary CPU processing time, thus decreasing the power consumption considerably. A non-complex hardware solution and smaller and/or simpler CPU will also decrease the production costs for each unit.

DETAILED DESCRIPTION OF THE INVENTION

Figure 1:
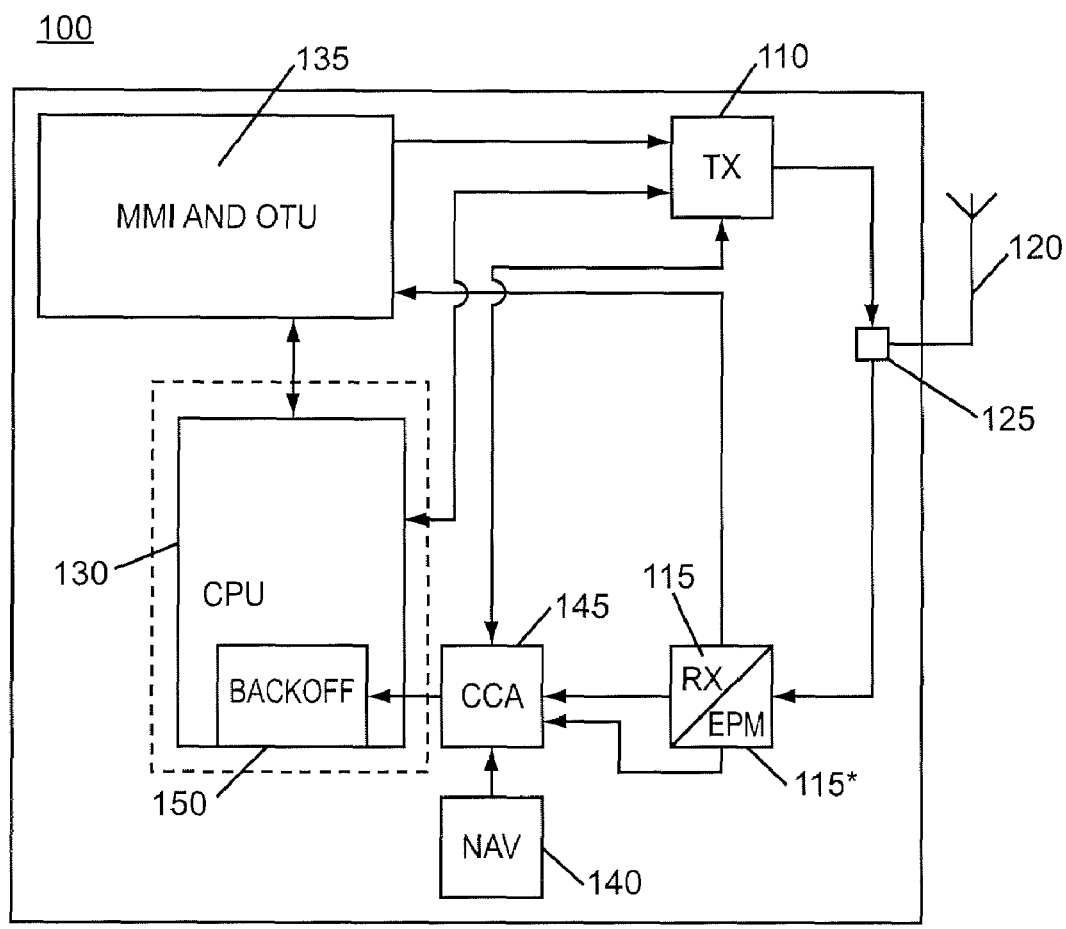
FIG. 1 illustrates schematically a block diagram of a terminal 100 for wireless radio communication.

FIG. 1 illustrates schematically a block diagram of a terminal 100 for wireless radio communication in any Carrier Sense Multiple Access/Collision Avoidance (CSMA/CA)

Network, such as Wireless LAN. The terminal 100 comprises a radio Transmitter (Tx) unit 110 and radio Receiver (Rx) unit 115, both connected to a terminal antenna 120 e.g. via a common switch and/or filter 125. A common Transceiver unit may be used instead of separate transmitter and receiver units. The terminal also comprises a Central Processing Unit (CPU) 130 controlling the Tx unit 110 and the Rx unit 115 via data busses. The terminal also comprises a number of other terminal units (OTU) 135 and functional circuits, such as Man-Machine-Interface (MMI), filters etc, some of which are connected to and/or controlled by said CPU 130.

The OTU 135 feeds information to the Tx unit 110 that modulates the information on one or more carriers and amplifies the modulated information signal before it is fed to the antenna 120 for transmission via the air interface to at least one receiving terminal. Modulated information signal is received by the antenna 120 and fed to the Rx unit 115 that demodulates the information signal. The demodulated information signal is fed to the OTU block 135 for further processing.

The information is transmitted in data packets. The data packets are sent over a selected channel. The channel has to be idle and therefore the terminal 100 has to watch the traffic of data packets from other terminals. As stated above, the transceiver/transmitter TX dispatcher has to consider the following:

Energy detect on the media originating from non-802.11 stations (microwave-ovens, or Bluetooth devices for example).

Transmissions from other 802.11 stations.

This type of access method involves a Carrier Sense Multiple Access/Collision Avoidance (CSMA/CA) system and a back-off function. In a CSMA/CA system, it is the job of a transceiver/transmitter (TX) scheduler to observe a shared media and, based on the observations, find a transmit opportunity for the own station/terminal.

The inputs to the scheduler are related to the following sources:

1. Base Band Transmitter/Transceiver (BB-TX) unit 110;
2. Base band Receiver (BB-RX) unit 115;
3. Network Allocation Vector (NAV) Timer unit 140;
4. Radio Frequency (RF) Energy detection unit 115*.

Said inputs are processed by the Clear Channel Assessment (CCA) unit 145 that generates a CCA-signal, which is fed and processed by the TX-scheduler 150 and the Backoff function within the control of the CPU 130.

These inputs are processed in accordance to a set of rules that is defined by the IEEE 802.11 standard, which rules strictly and unambiguously control when a station may access the media for transmission, i.e. the moment when the Tx unit could send the data packet in turn. The TX-scheduler 150 is usually implemented as a software state-machine. The problem with this set of rules is the need of complex processing that require a lot of CPU processing that consumes a lot of CPU time and battery power. Moreover, the channel traffic and noise situation (detected by the RF energy detection) cause perpetual interruptions of the CPU processing.

Figure 2:
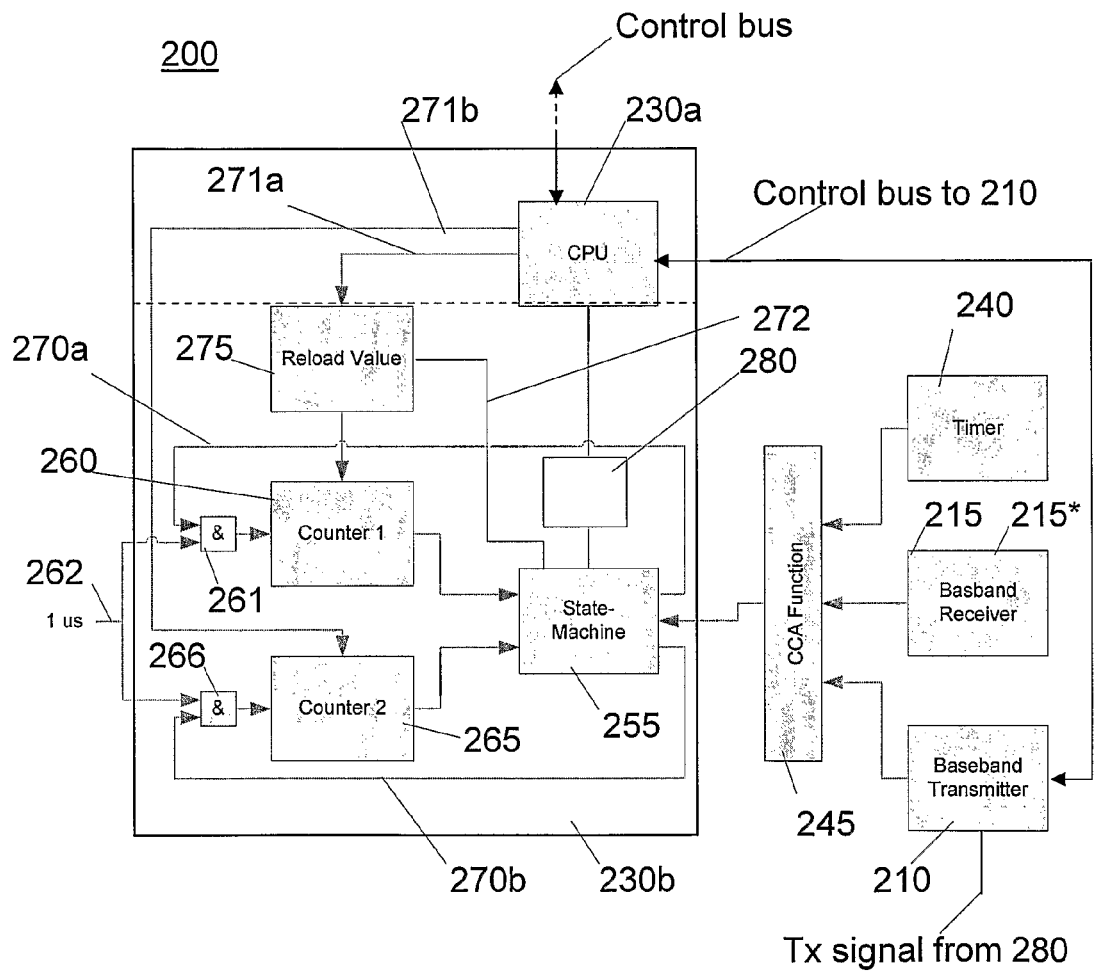
FIG. 2 is a block scheme schematically illustrating a terminal comprising an embodiment of the invented Tx-scheduler 200.

In FIG. 2, a terminal comprising an embodiment of the invented Tx-scheduler 200 is illustrated, indicated as 150 in FIG. 1. Said TX-scheduler can be described as a state-machine that comprises two different state-machines: One first TX-scheduler state-machine (FTSM) 230*a*, implemented as software program in the terminal CPU 130, and one second TX-scheduler state-machine (STSM) unit 230*b* implemented in hardware logic circuitry. The functional partitioning between the two state-machines is such that the most constrained real-time requirements are allocated to the STSM 230*b*, while all complex decisions and non time-critical controls are allocated to the FTSM 230*a*.

The invention comprises a Clear Channel Assessment (CCA) unit 245, which generates a CCA signal to the STSM unit 230*b* by means of the inputs that are retrieved from one or more of the following sources:

1. Baseband transmitter (BB-TX) unit 210;
2. Baseband receiver (BB-RX) unit 215;
3. NAV Timer unit 240;
4. Radio Frequency (RF) Energy detection unit 215*.

Figure 3:
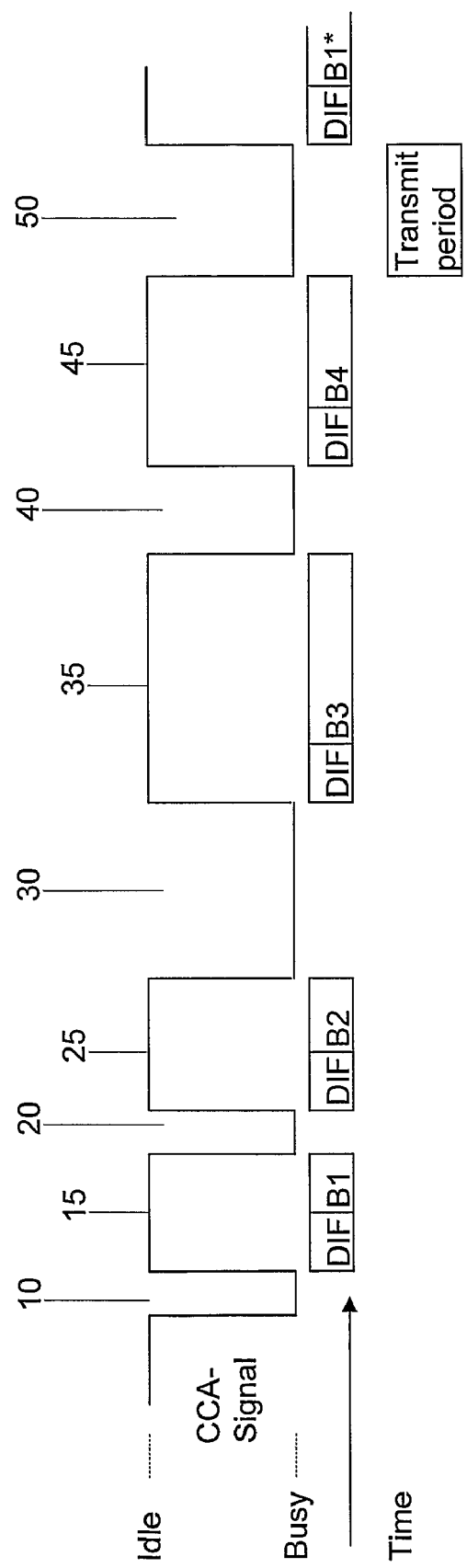
FIG. 3 illustrates an example of a CCA-signal and how the backoff periods and transmit period is controlled in real-time.

An example of the amplitude change in time of CCA signal during a time period is illustrated in FIG. 3. When the level of the CCA signal is high, the selected channel is idle, and when the level is low, the channel is busy. Each time the channel status changes from busy to idle, a guard period DIFS, indicated as DIF in FIG. 3, is started. When the guard period DIFS (Distributed Inter-Frame Space) is over, the backoff period starts and runs until it is completed, or if it is interrupted by the detection of radio frequency signals in the channel baseband. After the total backoff period $B_{tot}$ has lapsed, the terminal should have started to transmit the data packets. During the time periods indicated as 10, 20, 30 and 40, the CCA function will indicate that the channel is busy (BC). During the time periods indicated as 15, 25, 35 and 45, the CCA function will indicate that the channel is idle (NB). Each time the CCA signal switches from busy to idle, the DIFS guard period starts and when said period lapses, the counting (or measurement) of the total backoff period starts. However, as indicated in FIG. 3, the counting of the total backoff period may be interrupted by the switching of the CCA signal from idle to busy. The counting of the total backoff period will be started at the value at which it was stopped the previous time. The backoff period will not be reloaded to its start value until it is finished at the total backoff period value. B1, B2, B3, and B4 indicates sub-periods or sub-intervals of the total backoff period, i.e B1+B2+B3+B4, the sum of backoff sub-periods B1, will in this case result in the total backoff period $B_{tot}$. More generally, this could be described as $\Sigma B1 = B_{tot}$. When the total backoff period is indicated, the baseband transmitter will receive a transmit signal, if there is any data frame(s) or data packet(s) in the transmitter queue to be transmitted. During the transmission period 50, said packages are transmitted, and the channel will be busy. When the transmission is finished, the CCA function will change from busy to idle, and a new sequence of Guard periods and backoff periods will starts, whether there is any packets to be transmitted or not. The scheduler according to the invention will be running continuously according the described principle.

According to the present invention, the backoff period $B_{tot}$ and the guard period DIFS are established by means of hardware logic circuitry, which now will be described with reference to FIG. 2.

With reference to FIG. 2 again, the invention comprises a Clear Channel Assessment (CCA) circuit 245 for generating a CCA signal to a Second TX-scheduler State Machine (STSM) controller 255 of the STSM unit 230*b*, which comprises a first and a second counter and the STSM controller 255, wherein the first and second counter are connected to separate inputs of the STSM controller 255. Hence, the output signals from two counters 260, 265 are fed to the STSM controller 255. The state machine controls each counter by means of control signals on control busses 270*a* and 270*b*, respectively. As shown, each control signal is fed via the control bus to an and-gate 261, 266 of the counter 260, 265 the control signal is meant for, wherein each and-gate 261, 266 is connected to an input of each counter 260, 265. The control signals will work as stop and enabling signals, stopping or letting the clock signals 262 through to the counters, respectively. The counters are also controlled only at start-up of the terminal by the FTSM 230a via control busses 271a and 271b.

The first counter 260 is used for measuring the predetermined guard-period (DIFS), and is reloaded with its start value as soon as the CCA-Function signals 'channel busy'. This counter is in the following description also denoted as the Guard Period Counter (GPC) 260. The STSMC (255) is capable of generating a reloading signal to a reload value unit (275), which is able to reload and activate the GPC (260) via bus 272.

The second counter 265 is used as Back-off counter, and counts down to zero as soon as GPC 260 has reached zero. The second counter 265 is not reloaded at channel busy state. The second counter 265 is in the following description also denoted as the Backoff Period Counter (BPC). Default value of this counter may be set to zero. It will only count down when not zero(single shot counter).

The STSM controller 255 will be in different states depending on if the channel/media is idle or busy. If the channel is free, i.e. the channel is free from other terminal or microwave sources transmitting and the CCA-signal indicates idle, the STSM controller (STSMC) 255 may be in one of three states, Wait_guard, Wait_backoff or Idle_channel state. The STSM will remain in a first state, even called idle state, as long as there is no other activity on the channel. If one data packet or data frame is ready to be transmitted over the base band channel, it will be transmitted without any special delays. However, if the channel becomes occupied by another terminal transmitting, i.e. the channel is busy and the CCA-signal indicates busy, the STSM controller 255 will turn into its Wait_free state.

When the STSMC 255 receives a CCA-signal indicating busy channel, the STSMC 255 changes from the idle_channel state, to a second state, the Wait_free state. In this second state, the STSMC 255 will monitor the CCA-signal. The STSMC 255 will remain in the second state as long as the CCA-signal is indicating busy channel (BC).

When the CCA-signal is switching over from BC to not_busy (NB), the STSMC 255 changes from the wait_free state to a third state, the wait_guard state, and sets a guard period counter control signal, via control bus 270a, to start_counting causing the Guard Period Counter (GPC) 260 to run. If the counter 260 is not interrupted, the counter 260 is set to run the length of a guard period, even called DIFS, before stopping and generating a lapsed_guard_period signal to the STSMC 255.

If the CCA-signal is switched from NB to BC, the STSMC 255 will change from the third state, the wait_guard state, to the second state, wait_free state, and the STSMC 255 will set the GPC control signal, via control bus 270a, to stop_counting causing the guard period counter 260 to stop counting. Further, the STSMC 255 will forward a control signal to the reload value unit 275 to reload the guard period counter 260 to the start value of the guard period.

The STSMC 255 remains in the second state until the CCA-signal switches from BC to NB.

However, if the CCA signal remains indicating NB during the whole guard period, the GPC 260 generates a lapsed_guard_period signal to the STSMC 255, as mentioned above, indicating the DIFS period has lapsed. When the guard period has lapsed, the STSMC 255 switches to the next, fourth state, the Wait_backoff state. The STSMC 255 also sets a Backoff_Period_Counter_Control signal, via control bus 270b, to counting starting the Backoff Period Counter (BPC) 265 and keeping it running as long as the BPC control signal is indicating counting and the counter 265 has not reached its stop value indicating that the Backoff period is finished.

The STSMC 255 switches the BPC Control signal from counting to stop_counting if the CCA-signal switches from NB to BC.

If the BPC 265 is not interrupted, the BPC 265 will run a whole Backoff period. When the end of the backoff period is reached, the BPC 265 generates a lapsed_backoff_period signal, indicating that the backoff period is finished, to the STSMC 255.

When the lapsed_backoff_period_signal indicates that the backoff period is finished, and the lapsed guard period signal indicates that the guard period is finished and the CCA signal is indicating NB, the STSMC 255 generates a signal indicating Backoff_idle to a transmit control switch 280. The STSMC 255 is capable of signalling to the transmitting unit 110, 210 to transmit queued data information, if the transmit control switch 280, which is controlled by the CPU 230a, is set to allow the signalling to be received by the transmitting unit 110,210. The transmit control switch 280, which is controlled by the CPU 230a, is set to block said signalling to the transmitting unit 110,210, if there is no data information to be transmitted.

However, if the CCA signal changes to busy during the time that the backoff period and the BPC 265 is running, the STSMC 255 changes from the fourth state back to the second state, the Wait_free state. The STSMC 255 will temporarily interrupt the BPC 265 by setting the BPC control signal to stop_counting interrupting the backoff counter 265. Unlike the GPC 260, the BPC 265 is not reloaded at count interruption. The BPC 265 saves (and/or stores) the counter value at the moment for the interruption. This interruption counter value is the BPC's start value, when the BPC Control signal is switched by the STSMC 255 to start_counting. However, BPC control signal will not switch to start_counting until the STSMC 255 is in the fourth state, the Wait_backoff state, again. The STSMC 255 has to pass and execute the third state, the Wait_guard state, and the GPC 260 must generate a lapsed_guard_period signal to the STSMC 255, as mentioned above, indicating that the guard period, DIFS, has lapsed.

As mentioned above, when the whole backoff period has lapsed, i.e. the BPC has reached the stop value, the BPC generates a lapsed_backoff_period signal, to the state machine STSMC 255, which signals Backoff_idle to the transmit control switch 280 that will forward the signal to the transmitter 110 to transmit, or blocks the signal. The STSMC 255 returns to the idle state, the first state, in which state the STSMC monitors the CCA-signal.

In the above described embodiment of the invention, the TX scheduler is only described to serve one single queue of data frames or packets to be transmitted over a communication medium. However, in another embodiment wherein N different data packet queues have to be transmitted, it is only to add one STSM unit 230b for each queue to be served and connect each STSM unit to the CPU. The CPU will be upgraded to receive and set described control signals for each STSM unit.

Figure 4:
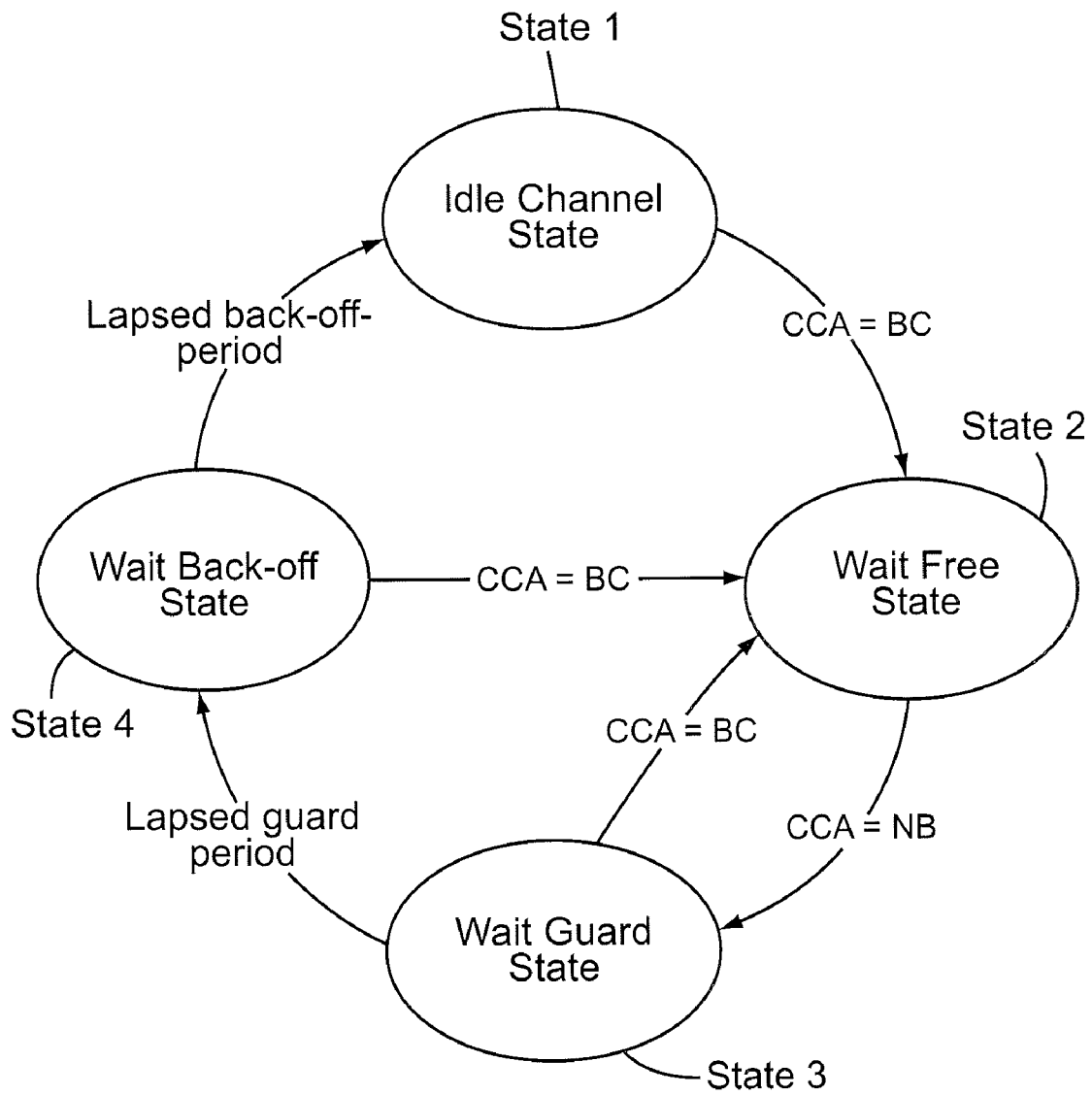
FIG. 4 is a state chart illustrating the operation of one of the state-machine controllers in an embodiment of the invention.

In FIG. 4, a state chart is illustrating the operation of the STSMC 255 in an embodiment of the invention.

The operation is in this example started when the STSMC 255 is in its idle_channel state, state 1. In the idle_channel state, the STSMC is waiting and monitoring the CCA-signal from the CCA unit 145, 245. When the CCA-signal indicating busy_channel is received, the STSMC 255 changes to the wait_free state, state 2. When the CCA-signal changes from BC to NB, the STSMC changes to wait_guard state, state 3, starts the guard period counter 260 by setting the GPC control signal to start_counting. In state 3, the STSMC monitors continuously the CCA-signal and the output from GPC 260 for a lapsed_guard_period signal. If the CCA-signal is changed to BC before the lapsed_guard_period signal is set, the GPC 260 is stopped and reloaded and the STSMC returns to state 2.

STSMC returns to state 3 when CCA-signal changes from BC to NB and a new guard period is started. If the CCA-signal is not changed to BC before the lapsed_guard_period signal is set, and the STSMC 255 receives the lapsed_guard_period signal, the guard period is finished. The STSMC now changes to wait_backoff state, state 4, and sets the BPC control signal to start_counting. In state 4, the STSMC monitors continuously the CCA-signal, and the output from BPC 265 for a lapsed_backoff_period signal. If the CCA-signal suddenly indicates BC during the backoff period, the STSMC changes from wait_backoff state, state 4, to wait_free state, state 2, the BPC 265 is stopped at the present counter backoff period value (which indicates the remaining time till backoff period end), where it will start when the start_counting signal is received again (when the STSMC is back in state 4), and the GPC 260 is reloaded. When CCA-signal changes from BC to NB, and a new guard period is started the STSMC changes from wait_free to wait_guard state, state 3. If the STSMC 255 is in state 3 and doesn't receive CCA signal=BC before the lapsed_guard_period signal is set, the STSM controller will go to state 4 and will start the backoff period counting from the present counter backoff period value.

When the STSMC 255 receives the lapsed_backoff_period signal in its wait_backoff state, the backoff period is finished the STSMC 255 changes from the wait_backoff state to idle state, state 1, and the STSMC 255 signals Backoff_idle to the control switch 280 for letting the transmitter 110, 210 to transmit the stored data packets or data frames. The STSMC 255 will stand by in the idle_channel state, state 1, till CCA-signal changes from NB to BC and the described operation steps are performed again.

According to the invention, the above described operation of the STSMC is possible to accomplish by means hardware logic circuitry, wherein the described measures in the operation steps is coded. Necessary software code in the FTSM is loaded or programmed and stored into a digital memory storage from which said code is accessible to a microprocessor, CPU, digital processing unit, etc.

For a person skilled in the art, the STSMC 255 is possible to design and implement by means of the programming language VHDL (Virtual Hardware Definition Language) and corresponding implementation tools for implementing the logic circuitry.

As an example, the code in VHDL for implementing an STSMC 255 according to the invention may be written as follows:

```
case state is
    when idle =>
        if (busy = '1') or (backoff_cntr /= 0) then
            state    <= wait_free;
            guard_cntr <= unsigned2int(guard_reload);
        end if;
    when wait_free =>
        guard_cntr <= unsigned2int(guard_reload);
        if busy = '0' then
            state <= wait_guard;
        end if;
    when wait_guard =>
        if busy = '1' then
            state    <= wait_free;
```

```
        guard_cntr <= unsigned2int(guard_reload);
        elsif guard_cntr = 0 then
            state <= wait_backoff;
        else
            guard_cntr <= guard_cntr - 1;
        end if;
    when wait_backoff =>
        if busy = '1' then
            state    <= wait_free;
            guard_cntr <= unsigned2int(guard_reload);
        elsif backoff_cntr = 0 then
            state <= idle;
```

By using a transmit scheduler according the described present invention, wherein a STSMC is designed to operate within the four described basic states, it is possible to reduce the software operating CPU of a terminal device essentially, thereby reducing the terminal power consumption considerably. For instance, it is easily understood that a very powerful and power consuming CPU is necessary for performing the known method for implementing a plurality of backoff counters in a single hardware backoff counter, earlier disclosed EP 1 333 620. The necessary hardware circuits in said prior art document is considerably more complex compared to the hardware circuits provided by the present invention as only four basic states are required.

In one embodiment of the invention, the first transmit scheduler state-machine (FTSM, CPU, 230a), is capable of controlling and administrate the second transmit scheduler state-machine (STSM) unit 230b in some aspects, especially at start up of the terminal. However, in a preferred embodiment the STSM controller (STSMC, 255) is running without any interference of the FTSM 230a.

The present invention is not limited to the above-described preferred embodiments. Various alternatives, modifications and equivalents may be used. As an example, if one or more other states are added to the state-machine STSMC according to the invention, such an operation will be regarded as a simple modification and result in a possible embodiment within the scope of the present invention. Therefore, the above embodiments should not be taken as limiting the scope of the invention, which is defined by the appended claims.

The invention claimed is:

1. A transmit scheduler for a terminal device transmitting and/or receiving data information in a Carrier Sense Multiple Access/Collision Avoidance (CSMA/CA) network; the transmit scheduler comprising:
   a first transmit scheduler state-machine (FTSM);
   a second transmit scheduler state-machine (STSM), different from said FTSM, and implemented in hardware logic circuitry; and
   a reload value unit;
   wherein functional partitioning between the FTSM and the STSM is such that the most constrained real-time requirements are allocated to the STSM while all complex decisions and non time-critical controls are allocated to the FTSM;
   wherein the STSM comprises a first guard period counter measuring the predetermined guard period and sending a first signal to a STSM Controller when the guard period has lapsed, and wherein the reload value unit is configured to reload and activate the first guard period counter;
   wherein the STSM comprises the STSM Controller operative to generate a reloading signal to the reload value unit, wherein the STSM Controller is configured to operate in and switch between four basic states:
- a first state present when a total backoff period has lapsed;
- a second state present when a communication medium is indicated as busy;
- a third state present during a predetermined guard period; and
- a fourth state present during each backoff counting period.

2. The transmit scheduler of claim 1 wherein the STSM controller is running without any interference of the FTSM.

3. The transmit scheduler of claim 1 wherein the STSM further comprises a second backoff period counter measuring a pre-determined Backoff period (Btot) and sending a second signal to the STSM Controller when the backoff period has lapsed.

4. The transmit scheduler of claim 3 wherein the STSM is connected to a Clear Channel Allocation (CCA) unit which monitors the communication medium and generates a Clear Channel Allocation (CCA) signal to the STSM Controller indicating if the medium is busy or idle.

5. The transmit scheduler of claim 4 wherein the CCA operatively receives input from at least one of the following:
- a Baseband transmitter (BB-TX) unit;
- a Baseband receiver (BB-RX) unit;
- a NAV Timer unit;
- a Radio Frequency (RF) Energy detection unit.

6. The transmit scheduler of claim 1 further comprising:
- a central processor unit (CPU);
- software program storage means for storing one or more software programs to be executed by the CPU;
- wherein the FTSM is implemented in program software comprising program software code executable by the CPU and stored in the software program storage means.

7. The transmit scheduler of claim 6 further comprising a transmitting unit for transmitting data information over the communication medium;
- a transmit control switch operative to selectively control whether a trigger signal from the STSM Controller reaches the transmitting unit;
- wherein the transmit control switch is controlled by the CPU; and
- wherein receipt of the trigger signal by the transmit unit causes the transmit unit to transmit queued data information.

8. The transmit scheduler of claim 7 wherein the transmit control switch blocks the trigger signal if there is no data information to be transmitted.

9. A terminal device capable of transmitting and/or receiving data information in a Carrier Sense Multiple Access/Collision Avoidance (CSMA/CA) network, said terminal device comprising:
- a central processing unit (CPU);
- software program storage means for storing software program to be executed by the CPU;
- a transmitting unit for transmitting data information over a communication medium within said network;
- a receiving unit for receiving data information over the communication medium;
- a transmit scheduler with functional partitioning between at least two state machines, including a first transmit scheduler state-machine (FTSM), a second transmit scheduler state-machine (STSM), different from said FTSM, and implemented in hardware logic circuitry, and a reload value unit;
- wherein functional partitioning between the FTSM and the STSM is such that the most constrained real-time requirements are allocated to the STSM while all complex decisions and non time-critical controls are allocated to the FTSM;
- wherein the STSM comprises a first guard period counter measuring a predetermined guard period and sending a first signal to a STSM Controller when the guard period has lapsed, and wherein the reload value unit is configured to reload and activate the first guard period counter;
- wherein the STSM comprises the STSM Controller operative to generate a reloading signal to the reload value unit, and wherein the STSM Controller is configured to operate in and switch between four basic states:
  - a first state present when a total backoff period has lapsed;
  - a second state present when the communication medium is indicated as busy;
  - a third state present during a predetermined guard period; and
  - a fourth state present during each backoff counting period.

10. The terminal device of claim 9 wherein the STSM controller is running without any interference of the FTSM.

11. The terminal device of claim 9 wherein the STSM further comprises a second backoff period counter measuring a pre-determined Backoff period (Btot) and sending a second signal to the STSM Controller when the backoff period has lapsed.

12. The terminal device of claim 11 wherein the STSM is connected to a Clear Channel Allocation (CCA) unit which monitors the communication medium and generates a Clear Channel Allocation (CCA) signal to the STSM Controller indicating if the medium is busy or idle.

13. The terminal device of claim 12 wherein the CCA operatively receives input from at least one of the following:
- a Baseband transmitter (BB-TX) unit;
- a Baseband receiver (BB-RX) unit;
- a NAV Timer unit;
- a Radio Frequency (RF) Energy detection unit.

14. The terminal device of claim 9 wherein the FTSM is implemented in program software comprising program software code executable by the CPU and stored in the software program storage means.

15. The terminal device of claim 14 further comprising
- a transmit control switch operative to selectively control whether a trigger signal from the STSM Controller reaches the transmitting unit;
- wherein the transmit control switch is controlled by the CPU; and
- wherein receipt of the trigger signal by the transmit unit causes the transmit unit to transmit queued data information.

16. The terminal device of claim 15 wherein the transmit control switch blocks the trigger signal if there is no data information to be transmitted.

* * * * *